(12) United States Patent
Ibrahim et al.

(10) Patent No.: US 7,944,904 B2
(45) Date of Patent: May 17, 2011

(54) SYSTEMS AND METHODS FOR MANAGING TIMING FUNCTIONS IN MULTIPLE TIMING PROTOCOLS

(75) Inventors: Yaser M. Ibrahim, Richardson, TX (US); Joseph Michael Erickson, Frisco, TX (US); Alon Paycher, Beith-Hananva (IL); Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1014 days.

(21) Appl. No.: 11/740,105

(22) Filed: Apr. 25, 2007

(65) Prior Publication Data

US 2008/0267160 A1 Oct. 30, 2008

(51) Int. Cl.
*H04J 3/00* (2006.01)
(52) U.S. Cl. .......................... 370/345; 710/313; 375/346
(58) Field of Classification Search .................. None
See application file for complete search history.

(56) References Cited

U.S. PATENT DOCUMENTS

| 6,408,351 | B1 | 6/2002 | Hamdi et al. | |
| 7,151,945 | B2 | 12/2006 | Myles et al. | |
| 2007/0092046 | A1* | 4/2007 | Lee | 375/346 |
| 2007/0294456 | A1* | 12/2007 | Chan et al. | 710/313 |

FOREIGN PATENT DOCUMENTS

| JP | 11203859 A | 7/1999 |
| KR | 1020030086163 A | 11/2003 |
| WO | 0108160 A1 | 2/2001 |
| WO | 2005062855 A2 | 7/2005 |

OTHER PUBLICATIONS

PCT/US2008/061242 Search Report mailed Oct. 10, 2008.

* cited by examiner

*Primary Examiner* — Phuoc Doan
(74) *Attorney, Agent, or Firm* — Steven A. Shaw; W. James Brady; Frederick J. Telecky, Jr.

(57) ABSTRACT

One embodiment of the present invention includes a system for managing timing functions associating with at least one timing protocol. The system comprises a controller configured to implement a plurality of functions at each of a respective plurality of scheduled times. The system also comprises a time protocol converter configured to convert each of the plurality of scheduled times to a respective plurality of time values associated with a master timing protocol. The system further comprises a master timer controller configured to generate a plurality of control signals associated with the plurality of functions based on an accumulated value of a master timer associated with the master timing protocol relative to the plurality of time values.

17 Claims, 3 Drawing Sheets

SYSTEMS AND METHODS FOR MANAGING TIMING FUNCTIONS IN MULTIPLE TIMING PROTOCOLS

TECHNICAL FIELD

This invention relates to electronic circuits, and more specifically to systems and methods for managing timing functions in multiple timing protocols.

BACKGROUND

As the demand for electronic devices increases, technology has improved to provide designs for electronic devices that operate more quickly and efficiently. In a given electronic device, many interconnected components are designed to operate based on very specific timing relative to each other. As such, typical electronic devices operate using timers configured to signal a time to perform one or more functions. Some electronic devices, such as wireless universal serial bus (WUSB) transceivers, implement a number of different timers operating in different timing protocols to control a variety of functions associated with each of the different timing protocols.

FIG. 1 illustrates an example of a network 10 that implements a variety of different timing functions. The network 10 includes a host device 12 that implements a WUSB communication protocol 14 to act as a wireless host in communicating with a wireless device 16, demonstrated in the example of FIG. 1 as a wireless mouse. The host device 12 can be a computer, or can be any of a variety of other networked devices. As an example, a printer on a wireless network can act as a host for a digital camera via a wireless channel. In the example of FIG. 1, the host device 12 can also implement the WUSB communication protocol 14 to communicate with any of a variety of other wireless devices 16, as well, such as a wireless hard-drive and/or a wireless camera. The host device 12 and the wireless device 16 wirelessly communicate on a wireless channel 18 that includes communication packets configured in the WUSB communication protocol 14.

The WUSB communication protocol 14 includes a transaction timer 20. The transaction timer 20 is a timer that typically increments in a time base of approximately 1 µs, and thus has a frequency of approximately 1 MHz. The transaction timer 20 is configured to control timing associated with the host device 12 to send control packets called microscheduled management command (MMC) packets to the wireless device 16 and to transmit and receive data packets and/or other types of packets (e.g., handshaking and/or notification packets) from the wireless device 16. Upon transmitting an MMC packet, the host device 12 resets the transaction timer 20 to zero and sets a scheduled time to perform a function based on an accumulated value of the transaction timer 20. As an example, the scheduled time could be a scheduled time for the computer 12 to transmit a data packet to the wireless device 16, or to activate its receiver to receive a data packet from the wireless device 16. In a similar manner, upon receiving the MMC packet, the wireless device 16 can reset its own transaction timer to zero and can set a scheduled time based on a timestamp that is included in the MMC packet. For example, the scheduled time could be a scheduled time for the wireless device 16 to transmit a data packet, or could be a scheduled time for the wireless device 16 to receive a data packet from another device on the network, such that the scheduled time indicates a time at which the wireless device 16 is to enable its wireless receiver. The time for transmission of an MMC packet from the host device 12 is typically required to be very accurate (e.g., ±40 ns) to compensate for delay times associated with the interactions between a media-access control (MAC) layer on which the transaction timer 20 resides and a physical (PHY) layer from which packets are transmitted on the wireless channel 18.

The WUSB communication protocol 14 also includes a WUSB channel timer 22. Like the transaction timer 20, the WUSB channel timer 22 is a timer that typically increments in a time base of approximately 1 µs, and thus has a frequency of approximately 1 MHz. However, unlike the transaction timer 20, the WUSB channel timer 22 is free-running, such that it does not reset to zero in response to other functions and events. The WUSB channel timer 22 is typically implemented to synchronize the time base of the wireless device 16 with the host device 12. For example, the host device 12 can provide a reference timestamp in the WUSB channel time protocol that is adjusted for MAC-layer and PHY-layer interactions and other delays in an MMC packet that is transmitted to the wireless device 16. Thus, because the reference timestamp is adjusted for time delays, the wireless device 16 can update an internal WUSB channel timer with the timestamp and begin incrementing its internal WUSB channel timer at substantially the same rate as the WUSB channel timer 22, such that each of the host device 12 and the wireless device 16 have substantially synchronized WUSB channel timers. Therefore, the wireless device 16 can implement its internal WUSB channel timer to accurately schedule times for transmission of packets to the host device 12 via the wireless channel 18. Because the WUSB channel timer 22 is typically implemented as a free-running timer, it is typically required to have a very large range. Accordingly, the WUSB channel timer 22 is implemented as a 24-bit timer, with bits 0-7 counting in microseconds (i.e., from 0-124) and bits 8-23 counting in ⅛ milliseconds.

In the example of FIG. 1, the network 10 also includes a set-top box 24 that is coupled to a media device 26, demonstrated in the example of FIG. 1 as a digital television. The set-top box 24 is wirelessly coupled to the host device 12 via the wireless channel 18. However, in the example of FIG. 1, the set-top box 24 communicates with the host device 12 via internet protocol (IP). Thus, in addition to WUSB protocol 14, the host device 12 also includes a WiMedia MAC communication protocol 28 configured to interact with the WUSB communication protocol 14 and one or more other communication protocols to time schedule communications in a time-division multiplexed (TDM) manner over the wireless channel 18. Although the example of FIG. 1 demonstrates that the WUSB communication protocol 14 and the WiMedia MAC communication protocol 28 are separate, the WUSB communication protocol 14 can be considered as operating over the WiMedia MAC communication protocol 28.

The WiMedia MAC communication protocol 28 implements a superframe timer 30 to provide shared communication between the WUSB communication protocol 14 and IP over the wireless channel 18. The superframe timer 30 can be a 16-bit timer that, like the transaction timer 20 and the WUSB channel timer 22, can typically increment in a time base of approximately 1 µs, and thus has a frequency of approximately 1 MHz. Therefore, the superframe timer 30 can define a single superframe of 65,536 microseconds in which the WUSB communication protocol 14 and IP are TDM divided. Upon power-up of the host device 12, the WiMedia MAC communication protocol 28 can begin a superframe based on the last received beacon of the wireless device 16 and the set-top box 24. As such, the WiMedia MAC communication protocol 28 synchronizes superframe timers of the set-top box 24 and the wireless device 16 with the superframe timer 30, such that all of the superframe timers are synchronized with the slowest device beacon. The WiMedia MAC communication protocol 28 can thus schedule packet transmission times on the PHY-layer using the superframe timer 30 on the MAC layer. Accordingly, the WUSB communication protocol 14 and IP can occupy the same wireless channel 18 without interfering with each other.

Because of the very specific functionality of the transaction timer 20, the WUSB channel timer 22, and the superframe timer 30, each of these timers is implemented in a different timing protocol. As a result, the host device 12 and the wireless device 16 may include three separate hardware timing circuits to implement each of the three timers. In addition, each of the three hardware timing circuits are implemented from a clock signal that is specific to the timing operations, such that additional clock hardware for generating the clock signal and for clock edge-synchronization is required. Thus, the hardware that is required to implement the timers occupies additional space, results in added cost, and consumes more power. Furthermore, implementing the three separate timers in three separate timing protocols, such that each requires a dedicated hardware timing circuit, is inflexible in that additional timers and related functions that are subsequently needed would likewise require dedicated timing circuitry at an additional cost.

SUMMARY

One embodiment of the present invention includes a system for managing timing functions associating with at least one timing protocol. The system comprises a controller configured to implement a plurality of timing functions at each of a respective plurality of scheduled times. The system also comprises a time protocol converter configured to convert each of the plurality of scheduled times to a respective plurality of time values associated with a master timing protocol. The system further comprises a master timer controller configured to generate a plurality of control signals associated with the plurality of timing functions based on an accumulated value of a master timer associated with the master timing protocol relative to the plurality of time values.

Another embodiment of the present invention includes a method for managing a plurality of timing functions associated with a plurality of timing protocols. The method comprises generating a plurality of reference time values in a master timing protocol in response to a respective plurality of stimulus signals. Each of the plurality of stimulus signals can be configured to invoke at least one of the plurality of timing functions. The method also comprises generating a plurality of offset time values in the master timing protocol relative to each of the respective plurality of reference time values. The method further comprises activating a control signal associated with the at least one of the plurality of timing functions upon an accumulated time value of a master timer in the master timing protocol being equal to each of a plurality of scheduled time values that are equal to a sum of the respective plurality of offset time values relative to the respective plurality of reference time values.

Another embodiment of the present invention includes a communication system. The communication system comprises means for implementing a plurality of timing functions associated with a plurality of communication packets at a respective plurality of scheduled time values. The communication system also comprises means for generating a plurality of reference time values associated with the communication packets in a master timing protocol. The communication system also comprises means for converting the plurality of scheduled time values to the master timing protocol relative to the respective plurality of reference times values. The method further comprises means for generating a plurality of control signals corresponding to the plurality of timing functions associated with the communication packets based on a master timer associated with the master timing protocol relative to the converted plurality of scheduled time values.

DETAILED DESCRIPTION

The present invention relates to electronic circuits, and more specifically to a single timer for managing timing functions in multiple timing protocols. A high-frequency clock is provided as an input to a master timer that is configured as a free-running, high-frequency timer in a master timing protocol. A controller provides scheduled times corresponding to functions to be implemented at specific times. The scheduled times are configured as offsets relative to reference time values that are static time values of the master timer latched at specific times based on one or more stimulus signals. The stimulus signals can include, for example, one or more signals provided from the controller in response to an event from which a scheduled time is to be performed, such as the arrival of a packet in a communication system. The reference time values and the scheduled times are provided to a time protocol converter that is configured to convert the scheduled times to the master timing protocol relative to the reference time values. Upon an accumulated value of the master timer being equal to a converted scheduled time, a control signal, such as an interrupt or an enable signal, is generated corresponding to an associated timing function. Thus, a single timer can be implemented to manage a plurality of unrelated timing functions.

Figure 2:
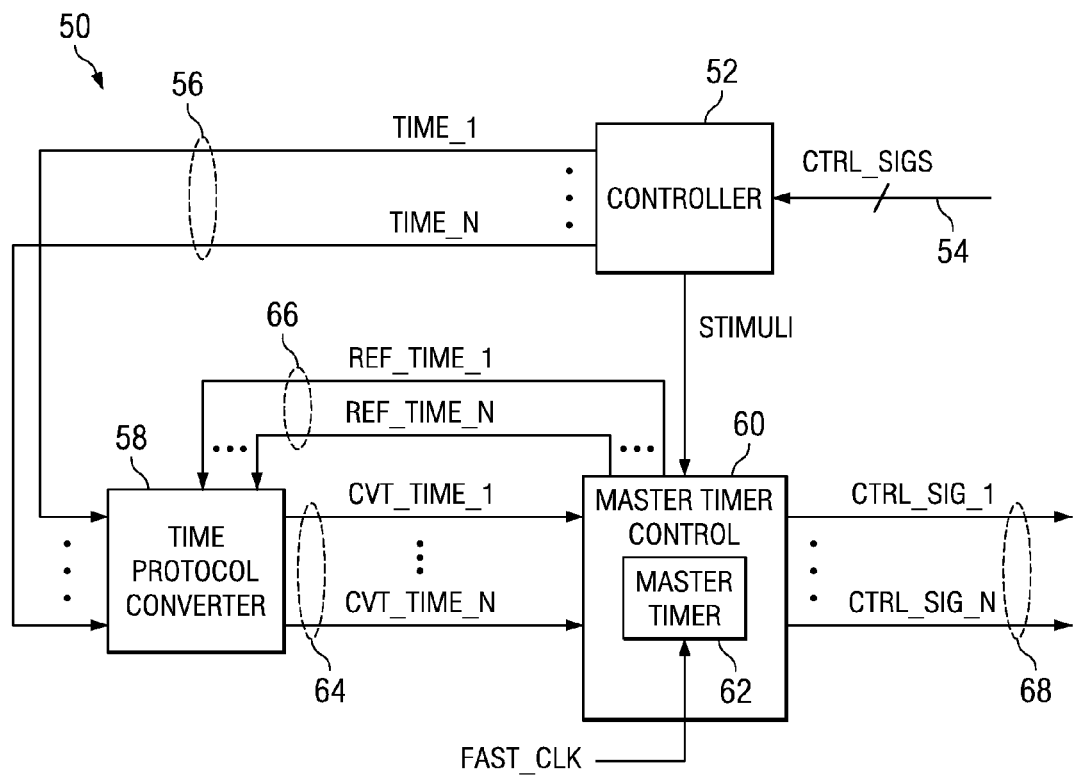
FIG. 2 illustrates an example of a timer system in accordance with an aspect of the invention.

FIG. 2 illustrates an example of a timer system 50 in accordance with an aspect of the invention. The timer system 50 in the example of FIG. 2 can be included in any of a variety of computing and/or communications devices that implements one or more timers. As an example, the timer system 50 can be included in a wireless device and/or a wireless host device in a wireless universal serial bus (WUSB) network, such that the timer system 50 can be configured to replace at least one of a transaction timer, a WUSB channel timer, and a superframe timer, as is described in greater detail in the example of FIG. 4 below.

The timer system 50 includes a controller 52 that is configured to implement a plurality of timing functions. As an example, the controller 52 can form at least a portion of firmware configured to transmit and receive communications signals at specific predetermined times. The timing functions can be triggered by one or more control signals 54 received by the controller 52, demonstrated in the example of FIG. 2 as CTRL_SIGS. For example, the control signals 54 can include interrupts, enable signals for a transceiver to transmit and/or receive a communication packet, or any of a variety of other signals. The timing functions can also be triggered independently of external signals provided to the controller 52, such as periodic timing functions of the controller 52.

To implement the timing functions, the controller 52 is configured to generate a plurality of scheduled times 56, demonstrated in the example of FIG. 2 as N scheduled time signals labeled TIME_1 through TIME_N, where N is a positive integer. The plurality of scheduled times 56 can each correspond to a timing function, such that the plurality of scheduled times 56 are future times at which the respective timing functions are to be performed. Each of the scheduled times 56 could correspond to one or more of the control signals 54 provided to the controller 52. As an example, one of the control signals 54 could be a signal that activates a receiver (not shown) to receive a control packet to which the controller 52 is required to respond. Thus, the scheduled time TIME_1 could be a time at which the controller 52 is required to transmit a corresponding control packet.

As another example, a control packet transmitted from a wireless host could prompt a wireless device to provide a responsive packet. The time for which the responsive packet is required to be sent could be included as a time-stamp in the received command packet, such as a transaction time for a WUSB device to send a data packet in response to a micro-scheduled management command (MMC) packet. Thus, if the timer system 50 is included in a wireless host, the controller 52 can provide the time in the time-stamp as a given one of the scheduled times 56. As a result, the scheduled times 56 could be times that are in any of a variety of timing protocols that could be separate and independent of each other.

The controller 52 provides the scheduled times 56 to a time protocol converter 58 and a signal STIMULI to a master timer controller 60. The master timer controller 60 includes a master timer 62 that is controlled by a high-frequency clock, demonstrated in the example of FIG. 2 as the signal FAST_CLK. The master timer 62 may be configured to have a granularity based on the frequency of the signal FAST_CLK that is small enough to account for the most accurate timing function implemented by the controller 52. In addition, the master timer 62 can be a free-running timer having a number of bits that is a function of the frequency of the signal FAST_CLK and a timing function having the longest repeatable time domain cycle that is implemented by the controller 52. Because the master timer 62 is configured to have a granularity and a time domain cycle that accounts for the most accurate timing function and the timing function having the longest repeatable time domain cycle, respectively, the master timer 62 thus defines a master timing protocol.

Figure 1:
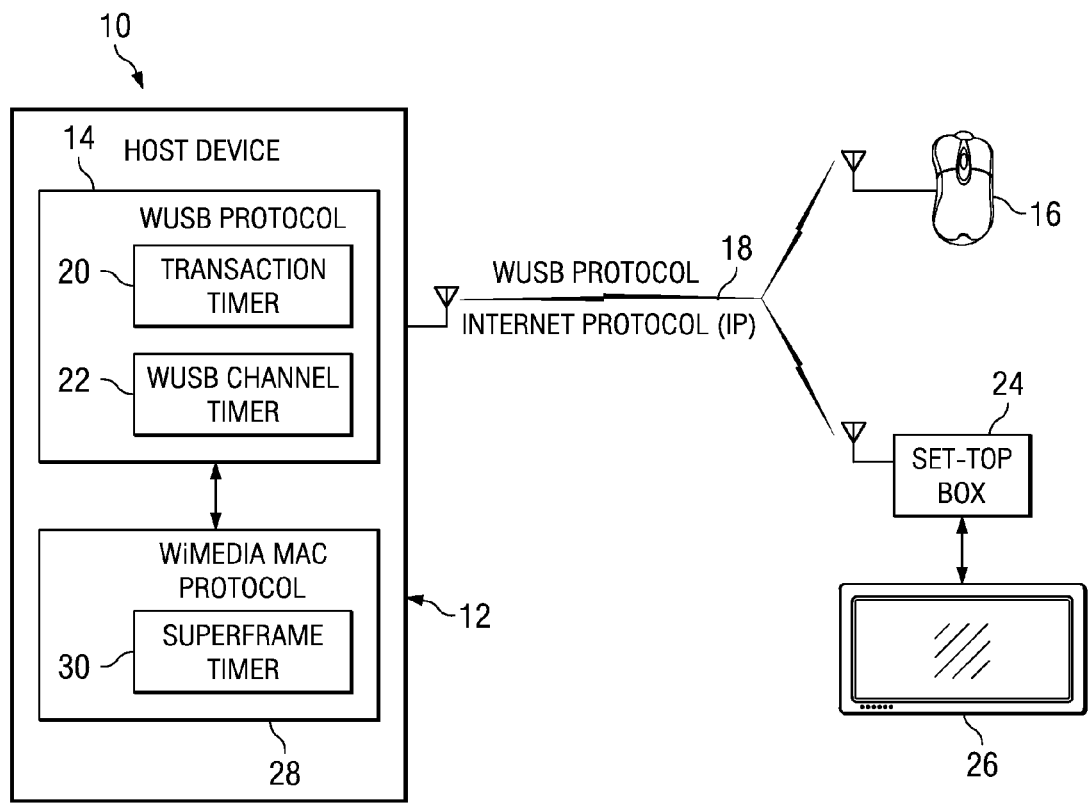
FIG. 1 illustrates an example of a prior art network implementing various communications protocols.

As an example, for the timer system 50 being implemented in a WUSB network similar to as described above in the example of FIG. 1, a time for transmission of an MMC packet is typically required to be very accurate (e.g., ±40 ns) to compensate for delay times associated with the interactions between a media-access control (MAC) layer and a physical (PHY) layer, as well as the strict timing requirements for WUSB transactions. Thus, the master timer 62 can be configured to increment at least 40 MHz to achieve an appropriate granularity for the accurate transmission time that is necessary for WUSB transactions and MMC packet transmissions. In addition, a WUSB channel timer in a WUSB network is a 24 bit timer with bits 8-23 counting in ⅛ milliseconds, and thus includes a repeatable 16-bit ⅛ millisecond granularity timer. Therefore, the WUSB channel timer can be the longest repeatable time domain cycle relative to a transaction timer and a superframe timer. Accordingly, for a master timer 62 controlled by a signal FAST_CLK having a frequency of 40 MHz, the master timer 62 can require at least 30 bits to represent an entire cycle of a WUSB channel timer.

The time protocol converter 58 is configured to convert the scheduled times 56 to scheduled time values 64, labeled CVT_TIME_1 through CVT_TIME_N, configured in the master timing protocol. The master timer controller 60 provides a plurality of reference times 66 as inputs to the time protocol converter 58, the reference times 66 being demonstrated in the example of FIG. 2 as REF_TIME_1 through REF_TIME_N. The reference times 66 can be configured in the master timing protocol, and each of the reference times 66 can correspond to a given one of the scheduled times 56. As an example, each of the reference times 66 can correspond to a static time value in the master timing protocol, such that each of the reference times 66 can be time values that are latched from the master timer 62 at specific times as designated by the signal STIMULI provided from the controller 52. Therefore, the time protocol converter 58 converts a given scheduled time 56 to the master timing protocol to generate a respective converted scheduled time 64 that is an offset relative to the respective reference time 66.

Each of the converted scheduled time values 64 are provided to the master timer controller 60. The master timer controller 60 is configured to generate a plurality of control signals 68 corresponding to each of the respective converted scheduled time values 64 based on the master timer 62, the control signals 68 being demonstrated in the example of FIG. 2 as CTRL_SIG_1 through CTRL_SIG_N. Specifically, for a given one of the converted scheduled time values 64, the master timer controller 60 generates a respective one of the control signals 68 in response to an accumulated value of the master timer 62 being equal to the given one of the scheduled time values 64.

The control signals 68 each correspond to the timing function for which the given scheduled times 56 were generated by the controller. As an example, the control signals 68 can include interrupts and/or enable signals for firmware and/or software implementation. Thus, the control signals 68 can be provided to the controller 52 to implement the respective timing function, or to generate another scheduled time 56, such that one or more of the control signals 68 can be provided as or in addition to the control signals 54. In addition, one or more of the control signals 68 can be provided to other components (not shown) in a computer or communication device in which the timer system 50 is included, such that the other components can perform the scheduled timing functions corresponding to the respective control signals 68.

In the example of the timer system 50 being implemented in a wireless device in a WUSB network, a packet received at the PHY-layer, such as an MMC packet, could include a time stamp that indicates a scheduled transaction time at which the controller 52 is required to provide an acknowledgement (e.g., a responsive packet or a data packet). Typically, as described above in the example of FIG. 1, the controller 52 would reset a transaction timer upon receiving the MMC packet and would transmit the acknowledgement upon the accumulated value of the transaction timer reaching the scheduled time provided in the time stamp. Thus, in the example of FIG. 2, the controller 52 would assert the signal STIMULI to latch a static time of the master timer 62, which is provided as one of the reference times 66 to the time protocol converter 58.

As an example, the controller 52 can also provide a scheduled transaction time that is time stamped in the MMC packet as one of the scheduled times 56 to the time protocol converter 58. Therefore, the time protocol converter 58 converts the scheduled transaction time to the master timing protocol relative to the reference time 66 that is latched from the master timer 62 upon the PHY-layer receiving the packet. As such, the signal STIMULI can be asserted at the beginning of a received packet and/or at the end of a received packet for subsequent transmission of a packet relative to the timing of the received packet. For example, the time protocol converter 58 can convert the scheduled transaction time from microseconds to the granularity of the master timer 62 (e.g., 1/40 MHz) and add it to the reference time 66 corresponding to the scheduled transaction time 56 to generate the converted scheduled time value 64 in the master timing protocol. Accordingly, the converted scheduled time value 64 in the master timing protocol is an offset time relative to the reference time 66 in the master timing protocol, such that the controller 52 can transmit a packet upon an accumulated value of the master timer 62 being equal to the converted scheduled time value 64.

It is to be understood that the timer system 50 is not intended to be limited to the example of FIG. 2. For example, although the time protocol converter 58 is demonstrated in the example of FIG. 2 as an independent component, it is to be understood that the time protocol converter 58 could be configured as a software routine residing in the controller 52, or as a combination of software and firmware configured to interact with each other to convert the scheduled times 56 into the converted scheduled time values 64. In addition, it is to be understood that the time protocol converter 58 can compensate for rollover in the master timer 62, as well as delays in converting the scheduled times 56 to the converted scheduled time values 64 by subtracting delay amounts from the converted scheduled time values 64. As an example, the delays can include delays in interaction of the MAC-layer and the PHY-layer and/or computational and processing delays. Furthermore, the time protocol converter 58 may be configured to provide one or more of the converted scheduled time values back to the controller 52, instead of to the master timer controller 60 for assertion of one or more control signals 68. For example, the controller 52 may include one or more of the converted scheduled time values 64 in a time stamp in a control packet, such as an MMC packet in a WUSB network, that is transmitted to a wireless device (not shown), such that the timing function is to be performed by the wireless device and not the controller 52. Accordingly, the timer system 50 can be configured in any of a variety of different ways.

Figure 3:
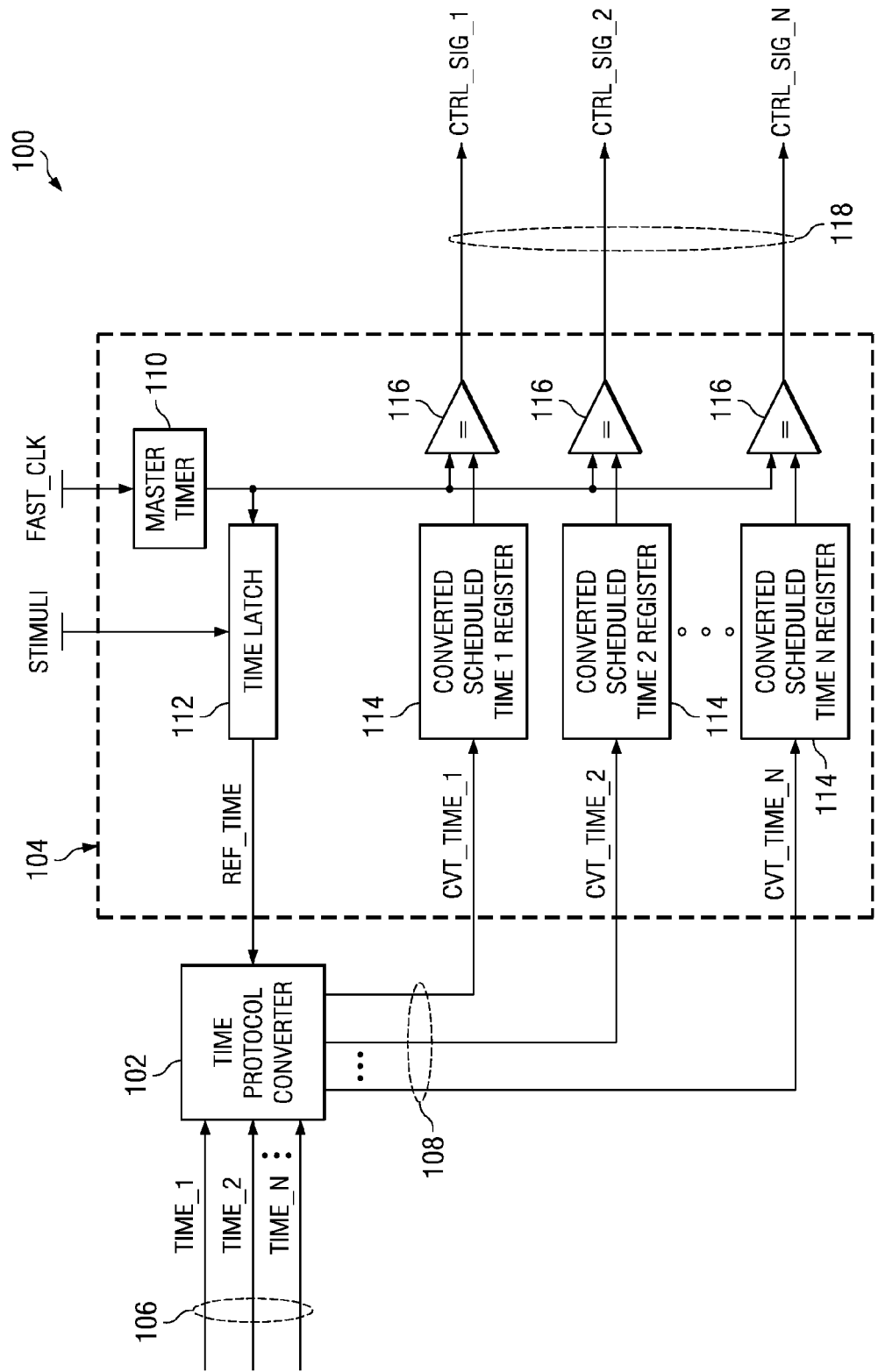
FIG. 3 illustrates another example of a timer system in accordance with an aspect of the invention.

FIG. 3 illustrates another example of a timer system 100 in accordance with an aspect of the invention. The timer system 100 includes a time protocol converter 102 and a master timer controller 104. The time protocol converter 102 and the master timer controller 104 can be configured substantially similarly to the time protocol converter 58 and the master timer controller 60 in the example of FIG. 2. Therefore, reference will be made to the example of FIG. 2 in the discussion of the example of FIG. 3.

Similar to as described above regarding the example of FIG. 2, the time protocol converter 102 is configured to convert scheduled times 106, labeled TIME_1 through TIME_N, to scheduled time values 108, labeled CVT_TIME_1 through CVT_TIME_N, where N is a positive integer, configured in the master timing protocol. The scheduled times 106, and thus the converted scheduled time values 108, can each correspond to a timing function, such that they can be future times at which the respective timing functions are to be performed. The scheduled time values 108 are provided to the master timer controller 104, similar to as described above in the example of FIG. 2.

The master timer controller 104 includes a master timer 110 that is controlled by a high-frequency clock, demonstrated in the example of FIG. 3 as the signal FAST_CLK. Similar to as described above regarding the example of FIG. 2, the master timer 110 may be configured to have a granularity based on the frequency of the signal FAST_CLK that is small enough to account for the most accurate timing function implemented by an associated controller. In addition, the master timer 110 can be a free-running timer having a number of bits that is a function of the frequency of the signal FAST_CLK and a timing function having the longest repeatable time domain cycle. Therefore, the master timer 110 defines the master timing protocol.

The master timer controller 104 also includes a time latch 112 that is coupled to the master timer 110. The time latch 112 receives one or more stimulus signals, such as provided by a controller, demonstrated in the example of FIG. 3 as a signal STIMULI. Upon assertion of the signal STIMULI, the time latch 112 latches a current static time value of the master timer 110 and provides the current static time value of the master timer 110 to the time protocol converter 102 as a reference time, demonstrated in the example of FIG. 3 as REF_TIME. Substantially concurrently, a scheduled time 106 is also provided to the time protocol converter 102 that corresponds to the reference time REF_TIME. Therefore, the time protocol converter 102 can convert the schedule time 106 to one of the scheduled time values 108 relative to the reference time REF_TIME. Accordingly, the respective converted scheduled time 108 is an offset relative to the respective reference time REF_TIME.

Unlike the example of FIG. 2, the example of FIG. 3 demonstrates only a single reference time REF_TIME provided from the master timer controller 104 to the time protocol converter 102. As described above in the example of FIG. 2, the controller 52 generates the scheduled times as future times at which respective timing functions are to be performed in response to command signals provided to the controller. The scheduled times 106 can thus be generated sequentially. As such, the single reference time REF_TIME is demonstrated as such in the example of FIG. 3 to illustrate that the time latch 112 is activated by the signal STIMULI to latch the current static time value of the master timer 110 at substantially the same time that a given one of scheduled times 106 is sequentially generated. Accordingly, each time a scheduled time 106 is generated, the signal STIMULI is asserted to activate the time latch 112 to generate a reference time REF_TIME for the generated scheduled time 106.

The scheduled time values 108 are input to a respective plurality of memory registers 114 in the master timer controller 104. The memory registers 114 can be included in one or more memory modules, such as a static random access memory (SRAM). Each of the memory registers 114 is coupled to a comparator 116 that is also coupled to the master timer 110. Each of the comparators 116 thus compares the converted scheduled time values 108 stored in the memory registers 114 with the accumulated value of the master timer 110. Upon the accumulated value of the master timer 110 being equal to one of the converted scheduled time values 108, the respective one of the comparators 116 provides one of a plurality of control signals 118 as an output, the control signals 118 being demonstrated in the example of FIG. 3 as CTRL_SIG_1 through CTRL_SIG_N.

The control signals 118 can each correspond to the timing function for which the given scheduled times 106 were generated. The control signals 118 can include interrupts and/or enable signals for firmware and/or software implementation. As an example, one of the control signals 118 can be an interrupt to begin a superframe, one of the control signals 118 can activate a transceiver to transmit or receive a packet, one or more of the control signals 118 can be provided to a controller to implement a timing function or to generate a scheduled time, one or more of control signals 118 can be provided to a logic circuit that implements the signal STIMULI, and/or one or more of the control signals 118 can be provided to other components in a computer or communication device in which the timer system 100 is included. Thus, the control signals 118 can be configured in any of a variety software and/or firmware applications that implement timing functions.

It is to be understood that the timer system 100 is not intended to be limited to the example of FIG. 3. For example, the memory registers 114 may be configured in a memory module separate from the master timer controller 104, such as in active RAM of the computer or communication device in which the timer system 100 is included. In addition, similar to as described above in the example of FIG. 2, it is to be understood that the time protocol converter 102 can be implemented as a software routine, and can compensate for rollover in the master timer 110, as well as delays in converting the scheduled times 106 to the converted scheduled time values 108. Furthermore, the signal STIMULI may not be asserted based solely on a timing function. For example, the signal STIMULI can be asserted to latch the static time value of the master timer 110 automatically in response to predetermined conditions, with only a portion of the conditions being important for timing functions. Therefore, the time protocol converter 102 can be configured to associate only the appropriate reference times REF_TIME with the scheduled times 106 to which they correspond.

Figure 4:
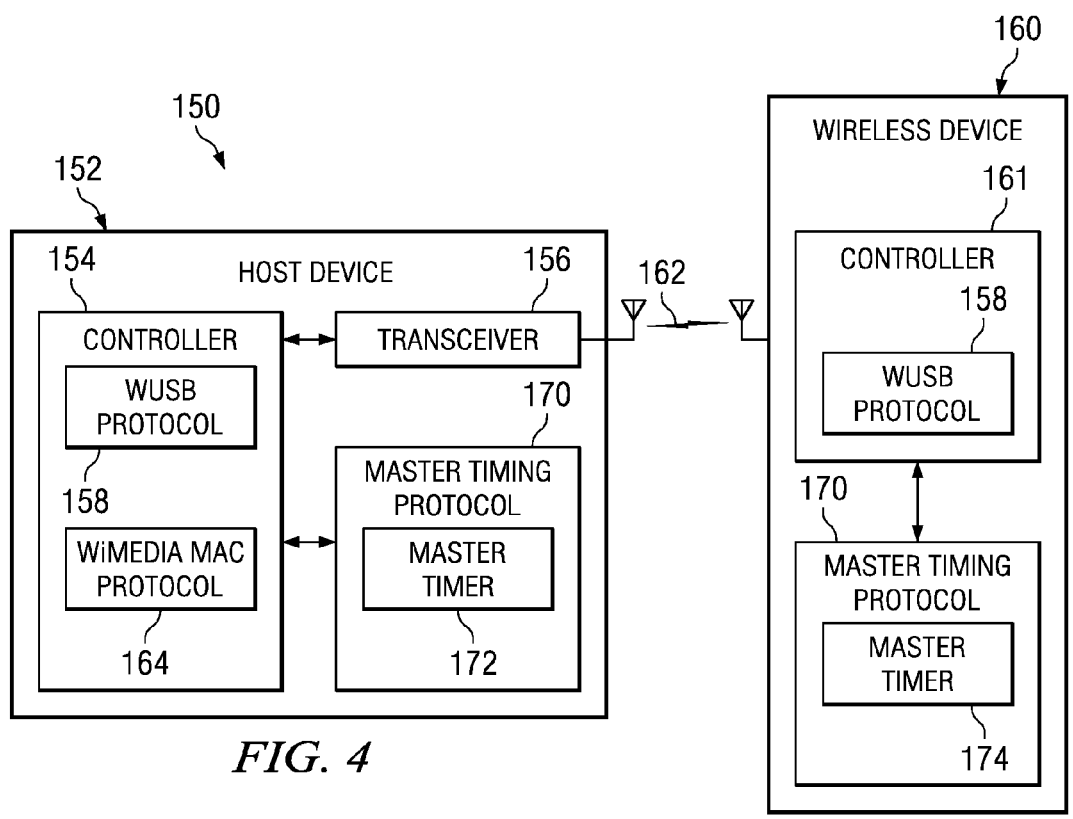
FIG. 4 illustrates an example of a network in accordance with an aspect of the invention.

FIG. 4 illustrates an example of a network 150 in accordance with an aspect of the invention. The network 150 includes a host device 152 having a controller 154 and a transceiver 156. The host device 152 can be a computer, or can be any of a variety of other networked devices. The controller 154 can be a communications controller configured to assemble packets and provide them to the transceiver 156 for transmission, and to disassemble communication packets that are received via the transceiver 156. In the example of FIG. 4, the controller 154 implements a WUSB communication protocol 158 to act as a wireless host in communicating with a wireless device 160. As an example, the wireless device 160 can be a wireless mouse, printer, hard-drive, and/or camera. The wireless device 160 likewise includes a controller 161 that implements the WUSB communication protocol 158. The controller 154 and the controller 161 communicate on a wireless channel 162 that includes communication packets configured in the WUSB communication protocol 158.

The controller 154 also includes a WiMedia MAC communication protocol 164, such that the controller 154 can provide wireless communications to and from other devices via a communication protocol other than the WUSB communication protocol 158. For example, the network 150 could also include a set-top box (not shown) that is coupled to a media device, such as a digital television. The set-top box could be wirelessly coupled to the transceiver 156 via the wireless channel 162, but could communicate with the controller via a communication protocol other than the WUSB communication protocol 158, such as internet protocol (IP). Thus, the WiMedia MAC communication protocol 164 is configured to interact with the WUSB communication protocol 158 and one or more other communication protocols to time schedule communications in a time-division multiplexed (TDM) manner over the wireless channel 162.

The controller 154 and/or the controller 161 can be configured to generate scheduled times for the WUSB communication protocol 158 and/or the WiMedia MAC communication protocol 164. For example, the controller 154 may schedule transaction times to control timing associated with sending and receiving packets to and from the wireless device 160. The time for transmission of an MMC packet from the host device 152 can be required to be very accurate (e.g., ±40 ns). As another example, the controller 154 may also provide WUSB channel times in a timestamp in the MMC packets, such that the controller 161 can update an internal WUSB channel timer with the timestamp and begin incrementing its internal WUSB channel timer for timed transmissions back to the host device 152. As another example, the controller 161 can receive an MMC packet from the controller 154 and can schedule a transaction time to transmit a data packet based on a time stamp in the MMC packet. As yet another example, the controller 154 may schedule times for assembling a superframe based on the WiMedia MAC communication protocol 164 to provide shared communication between the WUSB communication protocol 158 and another communication protocol, such as IP, over the wireless channel 162. As such, the WUSB communication protocol 158 and IP can occupy the same wireless channel 162 without interfering with each other. Similar to as described above in the example of FIG. 1, these scheduled times are typically implemented with separate hardware timers that each increment timers in separate timing protocols.

The host device 152 and the wireless device 160 each also include a master timing protocol 170 that is configured with a master timer 172 and a master timer 174, respectively. Each of the master timers 172 and 174 can be controlled by high-frequency clocks, and can be configured to have a granularity based on the frequency of the respective high-frequency clocks. Thus, the granularity of the master timers 172 and 174 can be small enough to account for the most accurate timing function implemented by the associated controllers 154 and 161, such as the required accuracy of packet transmission times. In addition, the master timers 172 and 174 can be free-running timers having a number of bits that is a function of the frequency of the high-frequency clock and a timing function having the longest repeatable time domain cycle, such as a WUSB channel timer.

The controller 154 is coupled to the master timing protocol 170, such that scheduled times and timestamps in MMC packets can be converted to the master timing protocol 170, similar to as described above in the examples of FIGS. 2 and 3. As an example, the controller 154 can convert a scheduled time in the master timing protocol to a transaction time and/or a WUSB channel time and can timestamp it in an MMC packet to be transmitted to the wireless device 160 via the transceiver 156. As another example, the controller 154 can assemble timed communications in a superframe based on interrupt signals that are provided in response to specific times of the master timer 172. In a similar manner, the controller 161 is coupled to the master timing protocol 170, as well, such that the controller 161 can receive an MMC packet from the controller 154 and convert one or more timestamps in the MMC packet to the master timing protocol 170. As such, the controller 161 can schedule transaction times in the master timing protocol 170 to transmit data or handshaking packets relative to a time in the master timing protocol 170 at which the MMC packet was received. The controllers 154 and 161 can thus each implement the respective master timers 172 and 174 as single timers to manage any of a variety of timing functions in multiple timing protocols to wirelessly communicate in the WUSB protocol 158 or in another communication protocol. Additionally, the host device 152 and the wireless device 160 can each be configured with any of a variety of other components that can likewise implement the master timers 172 and 174 for timing functions, such that the master timing protocol 170 is flexible to provide capability to manage any of a variety timing functions.

It is to be understood that the network 150 is not intended to be limited to the example of FIG. 4. For example, several components of the host device 152 and wireless device 160 have been omitted for the sake of simplicity of explanation. In addition, the master timing protocol 170 is not intended to be limited to use in WUSB communications, but can be configured for any of a variety of timing applications and/or devices that implement one or more timing protocols. As yet another example, it is to be understood that the master timing protocol 170 is not limited to being the same for both the host device 152 and the wireless device 160, but that each could implement different master timers having different granularities and numbers of bits. Furthermore, the master timing protocol 170 may not replace hardware timers configured in other timing protocols, but can be configured to operate in addition to other hardware timers, such as a transaction timer, a WUSB channel timer, and/or a superframe timer.

Figure 5:
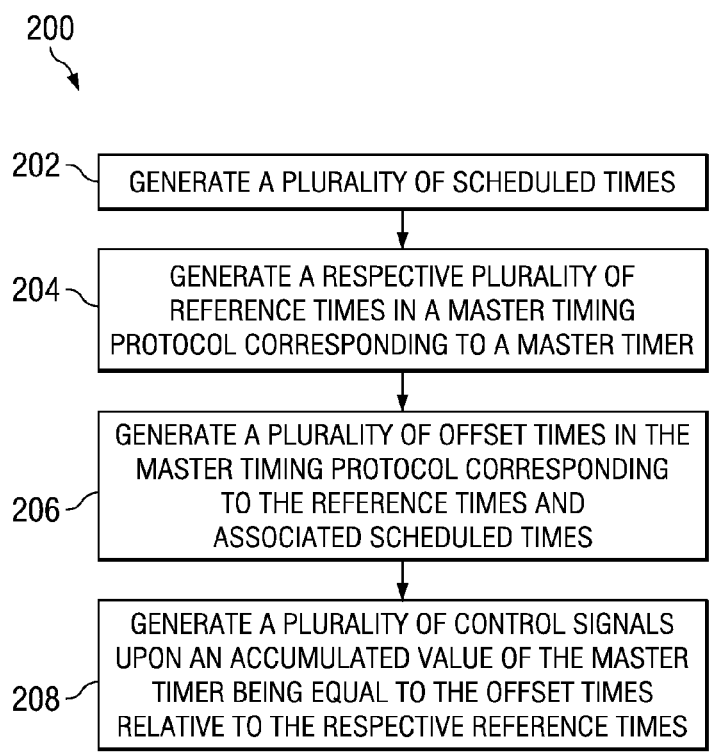
FIG. 5 illustrates an example of a method for implementing a single timer for multiple timing protocols in accordance with an aspect of the invention.

In view of the foregoing structural and functional features described above, methodologies in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates an example of a method 200 for implementing a single timer for multiple timing protocols in accordance with an aspect of the invention. At 202, a plurality of scheduled times are generated. The scheduled times can correspond to timing functions, and can be future times at which the timing function is to be performed. The scheduled times can be generated by a controller in response to one or more control signals and/or timing functions that have occurred. At 204, a respective plurality of reference times are generated in a master timing protocol corresponding to a master timer. The reference times can each correspond to a respective one of the scheduled times. The master timing protocol can correspond to a master timer that is a free-running timer controlled by a high-frequency clock. The master timer can be configured to have a granularity based on the frequency of the high-frequency clock, such that the granularity is small enough to account for the most accurate timing function implemented by an associated controller, such as the required accuracy of packet transmission times. The master timer can have a number of bits that is a function of the frequency of the high-frequency clock and a timing function having the longest repeatable time domain cycle. The reference times can be static time values latched from the master timer substantially concurrently with the generation of the scheduled times.

At 206, a plurality of offset times are generated in the master timing protocol for each of the scheduled times and associated reference times. The offset times can be times in the master timing protocol relative to the reference times that correspond to the scheduled times, in that the offset time plus the reference time corresponds to the scheduled time in the master timing protocol. Delays associated with the timing functions and rollover associated with the master timer can be accounted for in the offset times. The offset times relative to the reference times can be stored in a plurality of memory registers. At 208, a respective plurality of control signals are generated based on an accumulated value of the master timer being equal to the offset times relative to the reference times. The control signals can correspond to timing functions, and can include interrupts and/or enable signals for firmware and/or software. The timing functions can include functions associated with wireless communication, such as transmission and or reception of control packets.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system for managing timing functions associating with at least one timing protocol, the system comprising:
   a controller configured to implement a plurality of functions at each of a respective plurality of scheduled times;
   a time protocol converter configured to convert each of the plurality of scheduled times to a respective plurality of time values associated with a master timing protocol; and
   a master timer controller configured to generate a plurality of control signals associated with the plurality of functions based on an accumulated value of a master timer associated with the master timing protocol relative to the plurality of time values, the master timer controller comprising:
   a plurality of comparators configured to compare the accumulated time value with each of the respective plurality of time values, each of the plurality of comparators being further configured to generate a respective one of the plurality of control signals upon the accumulated value of the master timer being equal to the respective one of the plurality of time values.

2. The system of claim 1, wherein the plurality of time values are stored in a respective plurality of memory registers accessible by the master timer controller.

3. The system of claim 1, wherein the plurality of control signals comprises at least one of interrupts and communication enable signals.

4. The system of claim 1, wherein the master timer controller comprises a time latch configured to latch a static time value associated with the master timer in response to at least one stimulus signal.

5. The system of claim 4, wherein the static time value corresponds to a reference time associated with one of the plurality of functions, and wherein the time protocol converter generates an offset in the master timing protocol relative to the static time value associated with each of the plurality of scheduled times.

6. The system of claim 4, further comprising a transceiver configured to wirelessly transmit and receive communication packets, wherein the at least one stimulus signal comprises at least one of receiving a communication packet and transmitting a communication packet.

7. The system of claim 6, wherein the plurality of scheduled times comprises at least one of a scheduled time to transmit a packet, a scheduled time to activate the transceiver to receive a packet, and a time to generate an interrupt.

8. A system for managing timing functions associating with at least one timing protocol, the system comprising:
- a controller configured to implement a plurality of functions at each of a respective plurality of scheduled times;
- a time protocol converter configured to convert each of the plurality of scheduled times to a respective plurality of time values associated with a master timing protocol;
- a master timer controller configured to generate a plurality of control signals associated with the plurality of functions based on an accumulated value of a master timer associated with the master timing protocol relative to the plurality of time values, the master timer controller comprising a time latch configured to latch a static time value associated with the master timer in response to at least one stimulus signal; and
- a transceiver configured to wirelessly transmit and receive communication packets, wherein the at least one stimulus signal comprises at least one of receiving a communication packet and transmitting a communication packet, wherein the transceiver is wirelessly coupled to at least one device via a wireless universal serial bus (WUSB) connection such that the plurality of scheduled times comprise WUSB transaction times associated with communication packets, and wherein the time protocol converter is configured to convert the master timing protocol into WUSB channel times such that control packets transmitted to the at least one device are time stamped with the WUSB channel times.

9. The system of claim 8, wherein the transceiver is further wirelessly coupled to at least one additional device via a respective additional communication protocol, and wherein the plurality of control signals comprise WiMedia MAC superframe interrupts.

10. A method for managing a plurality of timing functions associated with a plurality of timing protocols for a wireless network, the method comprising:
- generating a plurality of reference time values in a master timing protocol in response to a respective plurality of stimulus signals, each of the plurality of stimulus signals being configured to invoke at least one of the plurality of timing functions;
- generating a plurality of offset time values in the master timing protocol relative to each of the respective plurality of reference time values;
- storing the plurality of adjusted time values in a respective plurality of memory registers; and
- activating a control signal associated with the at least one of the plurality of timing functions upon an accumulated time value of a master timer in the master timing protocol being equal to each of a plurality of scheduled time values that are equal to the respective plurality of offset time values relative to the respective plurality of reference time values, activating the control signal comprising comparing the accumulated time value of the master timer with the plurality of scheduled time values stored in the respective plurality of memory registers.

11. The method of claim 10, wherein generating a plurality of reference time values comprises latching static reference time values from the master timer in response to the respective plurality of stimulus signals.

12. The method of claim 10, further comprising:
- wirelessly transmitting and receiving communication packets; and
- activating the plurality of stimulus signals at least one of a beginning and an end of at least one of a transmitted communication packet and a received communication packet.

13. The method of claim 12, wherein activating a control signal comprises at least one of wirelessly transmitting a communication packet in response to a control signal, activating a receiver to wirelessly receive a communication packet, and generating an interrupt.

14. The method of claim 10, wherein the wireless network is a wireless universal serial bus (WUSB) network.

15. A communication system comprising:
- means for implementing a plurality of timing functions associated with a plurality of communication packets at a respective plurality of scheduled time values;
- means for generating a plurality of reference time values associated with the communication packets in a master timing protocol;
- means for converting the plurality of scheduled time values to the master timing protocol relative to the respective plurality of reference times values, wherein the means for converting the plurality of scheduled time values comprising means for generating a plurality of offset times in the master timing protocol relative to the respective plurality of reference time values to generate the converted plurality of scheduled time values, and wherein; and
- means for generating a plurality of control signals corresponding to the plurality of timing functions associated with the communication packets based on a master timer associated with the master timing protocol relative to the converted plurality of scheduled time values, wherein the means for generating the plurality of control signals comprising means for comparing an accumulated time value of the master timer with the plurality of converted scheduled time values.

16. The system of claim 15, wherein the means for generating the plurality of reference time values comprises means for latching a plurality of static time values of the master timer associated with the master timing protocol in response to a respective plurality of stimulus signals associated with at least one of transmitting and receiving the plurality of communication packets.

17. A wireless universal serial bus (WUSB) network comprising the communication system of claim 15.

* * * * *